Jan. 9, 1968            L. M. PIERCE            3,362,765
SHAFT BEARING AND REPLACEABLE BEARING INSERT THEREFOR
Original Filed May 28, 1963
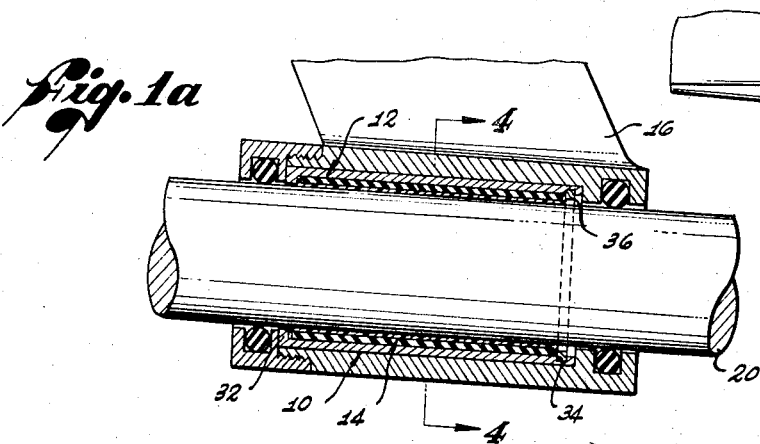
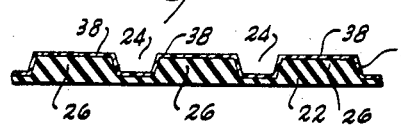
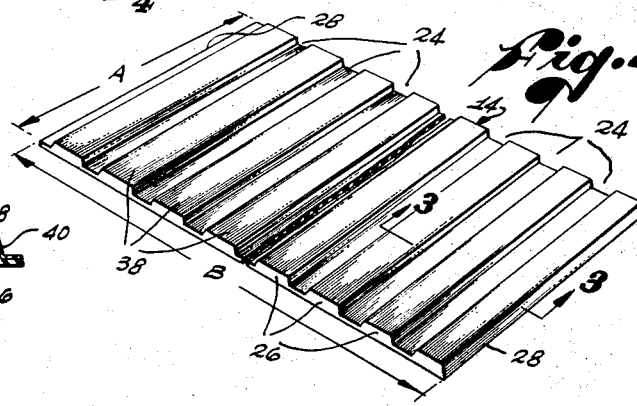
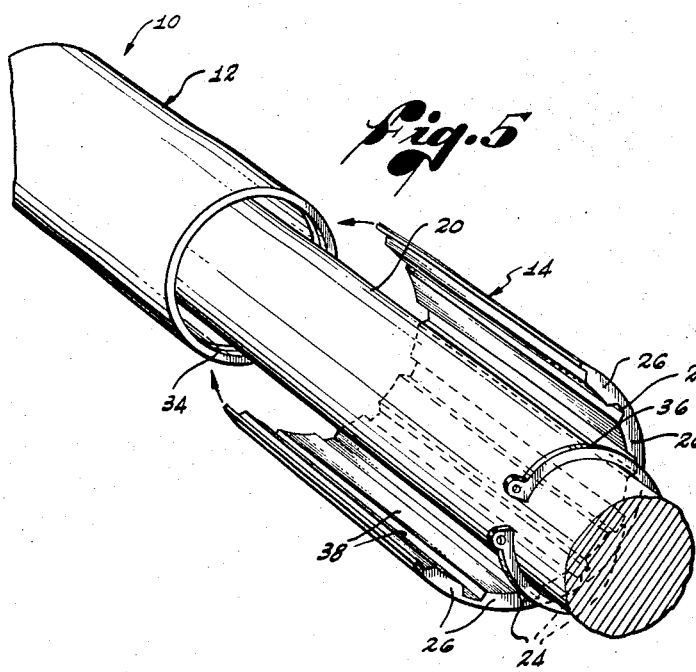
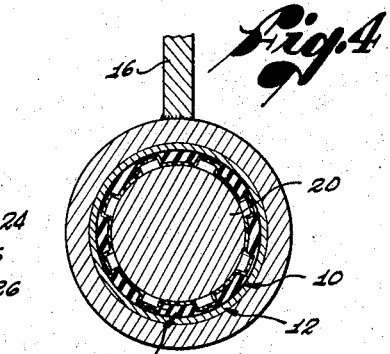
INVENTOR.
LAIRD M. PIERCE
BY Forrest J. Lilly
ATTORNEY

United States Patent Office 3,362,765
Patented Jan. 9, 1968

3,362,765
SHAFT BEARING AND REPLACEABLE
BEARING INSERT THEREFOR
Laird M. Pierce, Rolling Hills, Calif., assignor to Plastic and Rubber Products Company, Los Angeles, Calif., a corporation of California
Continuation of application Ser. No. 283,818, May 28, 1963. This application Sept. 1, 1966, Ser. No. 587,352
5 Claims. (Cl. 308—238)

This application is a continuation of my co-pending application Ser. No. 283,818 filed May 28, 1963 of the same title, and now abandoned.

This invention relates generally to bearings and particularly to an improved shaft bearing and bearing insert therefor which are designed especially, though not exclusively, for marine use.

One type of shaft bearing which is widely used in marine applications comprises an outer metal supporting sleeve containing a bearing insert of rubber or other low friction marine bearing material. The internal surface of the insert is commonly axially grooved to define a multiplicity of circumferentially spaced, axially extended lands having bearing surfaces for rotatably supporting a shaft extending through the bearing. Any particles of sand or other matter which enter between these bearing surfaces and the shaft tend to be carried around into the grooves in the bearing insert by rotation of the shaft. The particles are then washed from the bearing by water flowing through the grooves.

In one existing marine bearing of this kind, the bearing insert is bonded directly to the metal supporting sleeve. Reconditioning of this bearing, when worn, therefore, necessitates removal and replacement of the entire bearing unit, including the metal supporting sleeve and its bonded insert. In another existing marine bearing of the character described, the bearing insert comprises a separate sleeve which can be axially removed from and inserted into the metal supporting sleeve. Each of these existing marine bearings is deficient, however, in that reconditioning of the bearing requires removal, and in some instances, replacement of the bearing sleeve because of the difficulty or impossibility of separating the bearing material from the rigid sleeve or housing that supports the bearing material.

A general object of this invention is to provide an improved shaft bearing of the character described with a novel removable flexible bearing liner or insert for the bearing.

Another object of the invention is to provide an improved shaft bearing of the character described in which the bearing insert can be replaced without removal of the sleeve supporting the bearing insert of rubber or the like.

Yet a further object of the invention is to provide a bearing insert of the character described which can be easily made to fit bearing sleeves of various diameters.

Other objects, advantages, and features of the invention will become readily evident as the description proceeds.

Briefly, the objects of the invention are attained in the present illustrative embodiment thereof by providing a shaft bearing equipped with a metal supporting sleeve and a bearing insert therefor in the form of a flexible rectangular sheet which can be rolled into a cylinder and then axially inserted into the supporting sleeve. When the bearing is intended for marine use, this sheet is typically composed of rubber and is grooved in a direction parallel to the axis of the supporting sleeve to form a multiplicity of circumferentially spaced, axially extending bearing lands on the insert. The bearing surfaces of the sheet is of low friction bearing material, for example, provided by a layer of "Teflon" or the like.

Two axially extended edges of the sheet abut one another or are closely spaced apart when the insert occupies its operative position in the supporting sleeve, whereby the insert forms a complete bearing. The insert is axially retained in the supporting sleeve by retaining shoulders or the like which may be arranged to permit the insert to be removed and replaced without removal of the supporting sleeve. A feature of the invention resides in the fact that the insert may be easily made or cut to fit bearing sleeves of various diameters.

A presently preferred embodiment of the invention will now be described in connection with the annexed drawing, wherein:

FIG. 1 is a partial view of the underside of a boat in which the present improved bearing has been installed;

FIG. 1a is an enlarged axial section through the lower end of the propeller shaft supporting strut of the boat in FIG. 1, illustrating the present bearing in position therein;

FIG. 2 is an enlarged perspective view of the present improved bearing insert embodied in the bearing of FIG. 1a, the insert being shown as unrolled and laid out flat;

FIG. 3 is an enlarged section taken on line 3—3 in FIG. 2;

FIG. 4 is a section taken on line 4—4 in FIG. 1a; and

FIG. 5 is a perspective view illustrating the manner of assembling the present bearing insert in its supporting sleeve.

The shaft bearing 10 illustrated in this drawing comprises an outer metal supporting sleeve 12 and a bearing liner or insert 14 removably positioned in the sleeve. In a typical marine application of the bearing, the latter is mounted in a stern-bearing housing, such as a propeller shaft supporting strut 16, of a boat 18 to journal the propeller shaft 20. The bearing is retained in position in the housing or strut by the usual bearing retaining means shown.

The bearing insert 14 will be seen to comprise a flexible sheet 22 which is typically composed of rubber or other suitable flexible, preferably resilient, material. In the illustrated bearing, the bearing insert is made from a flat rectangular rubber sheet, the length dimension A of the sheet being slightly less than the axial length of the supporting sleeve 12 and the width dimension B of the sheet approximating but less than the inner circumference of the sleeve. One surface of the sheet 22 is formed with a multiplicity of generally parallel grooves 24 extending lengthwise of the sheet. Grooves 24 are of uniform width and define therebetween lands 26, as shown.

The illustrated bearing insert 14 is placed in the supporting sleeve 12 by rolling the sheet 22 into a cylinder about an axis parallel to the grooves 24, with the latter innermost, and then axially inserting the rolled sheet into the sleeve, as shown in FIG. 5. Upon release of the rolled sheet in the sleeve 12, the inherent resiliency in the sheet causes the latter to expand outwardly against the inner surface of the sleeve. The width dimension B of the sheet 22 is such that in its normal operative position in the supporting sleeve 12, the two edges 28 of the sheet oppose each other and are disposed in close proximity to, or about, one another.

The bearing insert 14 may be axially retained in the supporting sleeve 12 in various ways. According to the preferred practice of the invention, the supporting sleeve is provided at one end with an internal annular retaining shoulder 32 and at the other end with an internal annular groove 34 receiving a snap ring 36, which shoulder and snap ring confine the bearing insert therebetween. The radial height of the shoulder 32 and snap ring 36 will be observed to be less than the radial height of the lands 26 of the bearing insert. Alternatively, the supporting sleeve may be provided with integral internal annular retaining shoulders at both ends for axially retaining the bearing insert in the sleeve.

In use, the shaft 20 extends through the bearing 10 and the surfaces 38 of the lands 26 of the bearing insert 14 provide bearing faces which rotatably support the shaft. The sheet, now in cylindrical form, has its two free edges 28 opposed to each other and extending axially. As seen in FIG. 5, the edges 28 are preferably between two successive lands. In those cases where the sheet 22 is composed of rubber or other material which is suitable as a marine bearing material, the bearing surfaces 38 of the lands 26 can be left bare for direct contact with the shaft 20.

According to a preferred practice of the invention, however, the land surfaces 38 are coated with a thin deposit or layer 40 of a durable bearing material having a minimum coefficient of friction, such as "Teflon." According to a further preferred practice of the invention, the entire grooved surface of the backing sheet 22, including the walls of the grooves 24, is coated with such a bearing material, as shown, for the reason that such a complete coating of the sheet provides more effective protection of the backing sheet and permits more effective washing of sand particles and the like from the bearing in operation. The "Teflon" or other bearing layer may be deposited on the backing sheet in any conventional way.

In operation, the shaft 20 is rotatably supported by lands 26 of the bearing insert 14. Any sand or the like which penetrates the bearing is carried around into the grooves 24 by rotation of the shaft and is washed from the bearing by water flowing through the grooves. When it becomes necessary to replace the insert in the bearing 10, it is done by removing the snap ring 36, collapsing and pulling the worn insert from the supporting sleeve 12 rolling and inserting the new bearing insert into the sleeve, in the manner described above and replacing the snap ring. All these steps can be performed without removing the sleeve from strut 16.

A feature of the invention resides in the fact that the present bearing insert is composed of a material that may be easily cut with a pair of shears or the like. As a consequence, large sheets, grooved on one side like the insert, may be molded or otherwise fabricated and then cut up into smaller pieces to make bearing inserts according to the invention. In this way, bearing inserts to fit any size bearing sleeves may be quickly and easily cut from such a large blank.

While the present improved shaft bearing has been described primarily in connection with its use in marine applications, it is obvious that the bearing and insert are capable of use in other shaft bearing applications.

Clearly, therefore, the invention is fully capable of attaining the objects and advantages preliminarily set forth.

While a presently preferred embodiment of the invention has been disclosed herein for illustrative purposes, various modifications of the invention are possible within the spirit and scope of the following claims.

I claim:
1. A shaft bearing of the submerged type comprising:
    an outer rigid bearing support having a cylindrical opening therethrough and two internal annular shoulders spaced axially apart within the opening,
    a replaceable cylindrical bearing insert removably positioned within said support between said shoulders, whereby said insert is confined against endwise movement by said shoulders,
    said bearing insert having internal axially extending, parallel grooves defining therebetween spaced axially extending bearing lands, and
    said bearing insert being split axially and constructed entirely of a flexible pliable material, whereby said insert may be manually contracted for axial removal from and insertion into said bearing support,
    the inner surface of said insert comprising a body of material different from the material defining the outer surface of said insert and having a lower coefficient of friction than the material at the outer surface of said insert.

2. A bearing as defined in claim 1 wherein the said material defining said outer surface comprises rubber.

3. A bearing as defined in claim 2 wherein said material at said inner surface is a layer of polytetrafluoroethylene.

4. A bearing as defined in claim 3 wherein said layer covers the crests of said lands and the sides and bottoms of said grooves.

5. A bearing as defined in claim 1 wherein at least one of said annular shoulders is removably mounted on said support whereby said bearing insert may be removed and replaced with a shaft extending through said opening.

References Cited

UNITED STATES PATENTS

| | | | |
|---|---|---|---|
| 2,324,083 | 7/1943 | Holmes | 308—238 X |
| 2,362,566 | 11/1944 | Lappert | 308—238 X |
| 2,675,283 | 4/1954 | Thomson | 308—238 |

MARTIN P. SCHWADRON, *Primary Examiner.*

ROBERT R. BUNEVICH, *Examiner.*